(12) United States Patent
Kameyama et al.

(10) Patent No.: US 11,891,176 B2
(45) Date of Patent: Feb. 6, 2024

(54) DETERMINATION OF POSITION SENDING INTERVAL FOR FLYING VEHICLE DEPENDENT UPON GROUND SURFACE BELOW VEHICLE

(71) Applicant: NTT DOCOMO, INC., Tokyo (JP)

(72) Inventors: Naoki Kameyama, Tokyo (JP); Tomoe Ushiro, Tokyo (JP); Youhei Oono, Tokyo (JP); Yuichiro Segawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 702 days.

(21) Appl. No.: 17/053,185

(22) PCT Filed: May 8, 2019

(86) PCT No.: PCT/JP2019/018397
§ 371 (c)(1),
(2) Date: Nov. 5, 2020

(87) PCT Pub. No.: WO2019/216340
PCT Pub. Date: Nov. 14, 2019

(65) Prior Publication Data
US 2021/0129988 A1    May 6, 2021

(30) Foreign Application Priority Data
May 9, 2018    (JP) ................ 2018-090612

(51) Int. Cl.
*B64C 39/02* (2023.01)
*G08G 5/00* (2006.01)

(52) U.S. Cl.
CPC ......... *B64C 39/024* (2013.01); *G08G 5/0082* (2013.01); *B64U 2201/104* (2023.01); *B64U 2201/20* (2023.01)

(58) Field of Classification Search
CPC ............... B64C 39/024; G08G 5/0082; B64U 2201/20; B64U 2201/104
USPC .......................................................... 701/4
See application file for complete search history.

(56) References Cited

U.S. PATENT DOCUMENTS

| 4,224,669 | A  | * | 9/1980 | Brame | ............... | G01C 5/005 |
|           |    |   |        |       |                 | 701/8 |
| 7,479,919 | B2 | * | 1/2009 | Poe | ................. | G08G 5/045 |
|           |    |   |        |     |                   | 342/29 |
| 9,559,753 | B2 | * | 1/2017 | McCormack | ......... | H04W 76/10 |
| 9,775,055 | B2 | * | 9/2017 | Born | ................ | H04W 24/04 |

(Continued)

FOREIGN PATENT DOCUMENTS

WO    2017026354 A1    2/2017

OTHER PUBLICATIONS

International Search Report issued in corresponding PCT Application No. PCT/JP2019/018397, dated Aug. 6, 2019.

*Primary Examiner* — Richard A Goldman
(74) *Attorney, Agent, or Firm* — Dilworth IP, LLC

(57) ABSTRACT

Recovery of a flying vehicle that has fallen to the ground is facilitated. A positioning unit measures a position of the flying vehicle during flight. A specification unit specifies a feature of a region on the ground corresponding to the measured position. A determination unit determines a sending interval of position information indicating the position of the flying vehicle, according to the specified feature. A sending unit sends the position information at the determined sending interval.

9 Claims, 4 Drawing Sheets

| FEATURE OF REGION ON GROUND | SENDING INTERVAL OF POSITION INFORMATION |
|---|---|
| PLAIN | T 1 |
| SPORTS FIELD | T 1 |
| AIRFIELD | T 1 |
| WOOD | T 2 |
| OCEAN | T 2 |
| HILLY AREA | T 2 |
| RESIDENTIAL AREA | T 2 |
| . . . | . . . |

117

(56) References Cited

U.S. PATENT DOCUMENTS

| | | | | |
|---|---|---|---|---|
| 2004/0029642 | A1* | 2/2004 | Akano | F41G 3/2655 |
| | | | | 463/49 |
| 2014/0031082 | A1* | 1/2014 | Zishaan | G08B 21/14 |
| | | | | 455/556.1 |
| 2016/0132031 | A1* | 5/2016 | Kozura | H04L 12/2832 |
| | | | | 700/275 |
| 2017/0132943 | A1* | 5/2017 | Moon | G08G 5/0008 |
| 2020/0267717 | A1* | 8/2020 | Ramanath | H04W 72/51 |
| 2021/0124376 | A1* | 4/2021 | Edara | G05D 1/12 |

\* cited by examiner

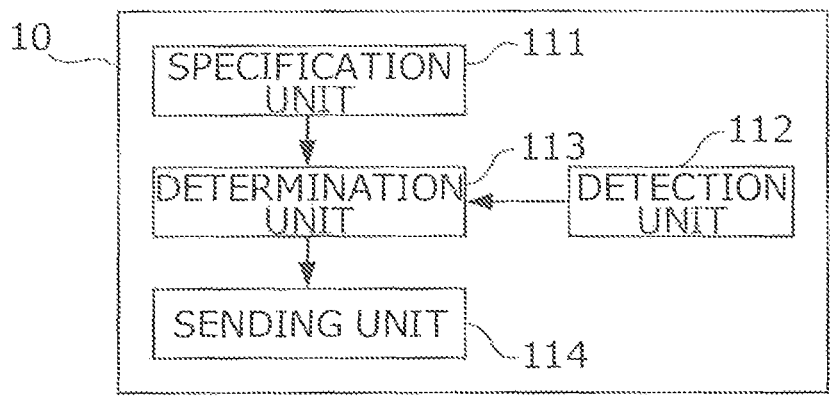
FIG. 4
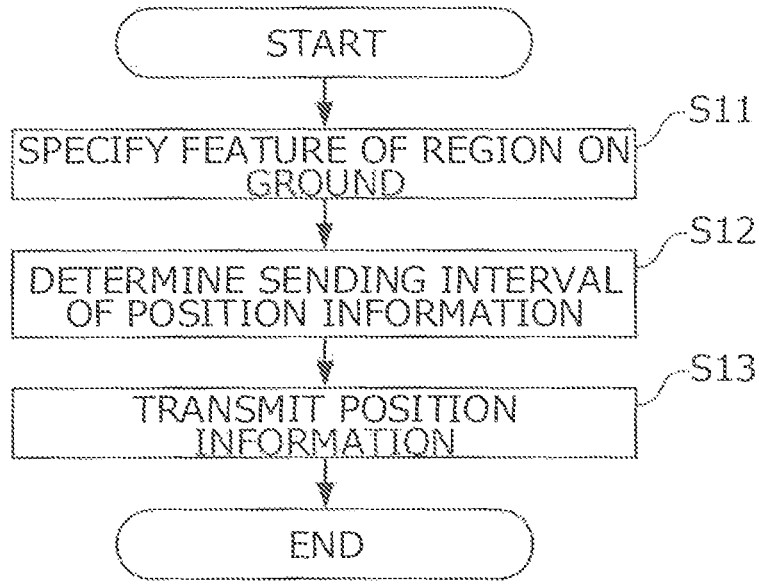
FIG. 5
| FEATURE OF REGION ON GROUND | SENDING INTERVAL OF POSITION INFORMATION |
|---|---|
| PLAIN | T 1 |
| SPORTS FIELD | T 1 |
| AIRFIELD | T 1 |
| WOOD | T 2 |
| OCEAN | T 2 |
| HILLY AREA | T 2 |
| RESIDENTIAL AREA | T 2 |
| . . . | . . . |
FIG. 6 ers 101 via a transmission mechanism that transmits the
DETERMINATION OF POSITION SENDING INTERVAL FOR FLYING VEHICLE DEPENDENT UPON GROUND SURFACE BELOW VEHICLE

TECHNICAL FIELD

The present invention relates to a technology for sending position information of a flying vehicle.

BACKGROUND

Technologies for grasping the position of a flying vehicle such as a drone are known. For example, WO 2017/026354 describes an unmanned aerial vehicle acquiring position information and transmitting the acquired position information to a predetermined destination.

With the technology described in WO 2017/026354, position information is transmitted after the flying vehicle has fallen to the ground. However, when the flying vehicle has fallen to the ground, for example, position information cannot be transmitted, in the case where the communication apparatus mounted in the flying vehicle is damaged or where the flying vehicle falls in a region where communication is not possible. In this case, it will not be known where the flying vehicle fell, making it difficult to recover the flying vehicle. Also, depending on the place where the flying vehicle fell, it may be difficult to recover the flying vehicle when the position of the flying vehicle cannot be grasped with the highest precision.

SUMMARY OF INVENTION

An object of the present invention is to facilitate recovery of a flying vehicle that has fallen to the ground.

The present invention provides a sending apparatus provided with a positioning unit that measures a position of a flying vehicle during flight, a specification unit that specifies a feature of a region on a ground corresponding to the measured position, a determination unit that determines a sending interval of position information indicating the position, according to the specified feature, and a sending unit that sends the position information at the determined sending interval during the flight.

Also, the present invention provides a program for causing a computer to execute a step of measuring a position of a flying vehicle during flight, a step of specifying a feature of a region on a ground corresponding to the measured position, a step of determining a sending interval of position information indicating the position, according to the specified feature, and a step of sending the position information at the determined sending interval during the flight.

According to the present invention, recovery of a flying vehicle that has fallen to the ground is facilitated.

BRIEF DESCRIPTION OF THE DRAWINGS

FIG. 4 is a diagram showing an example of a functional configuration of flying vehicle 10, in accordance with the present invention.

FIG. 5 is a flowchart showing an example of processing for sending position information that flying vehicle 10 performs in flight, in accordance with the present invention.

FIG. 6 is a diagram showing an example of table 117, in accordance with the present invention.

DETAILED DESCRIPTION

1. Configuration

Figure 1:
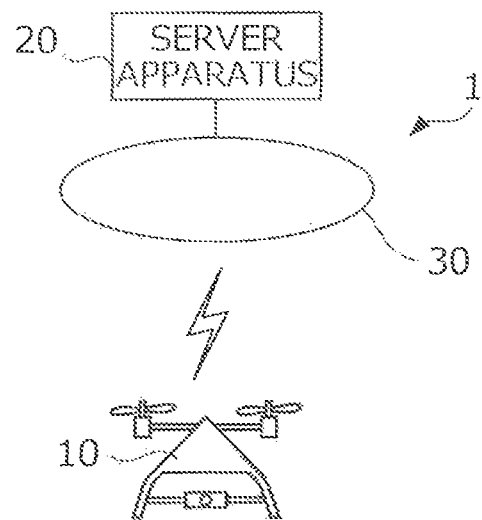
FIG. 1 is a diagram showing an example of a configuration of flight management system 1, in accordance with the present invention.

FIG. 1 is a diagram showing an example of a configuration of flight management system 1 according to the present embodiment. Flight management system 1 is a system that manages the flight of flying vehicle 10. Flight management system 1 is provided with flying vehicle 10 and server apparatus 20. Note that the number of apparatuses shown in FIG. 1 is illustrative, and is not limited thereto. For example, a plurality of flying vehicles 10 may be provided.

Flying vehicle 10 and server apparatus 20 are connected via communication line 30. Communication line 30 includes a wireless network and the Internet, for example, and transmits communication between flying vehicle 10 and server apparatus 20. Flying vehicle 10 transmits position information indicating a current position regularly to server apparatus 20. Server apparatus 20 recognizes the position of flying vehicle 10 based on the position information received from flying vehicle 10, and manages the flight of flying vehicle 10.

Figure 2:
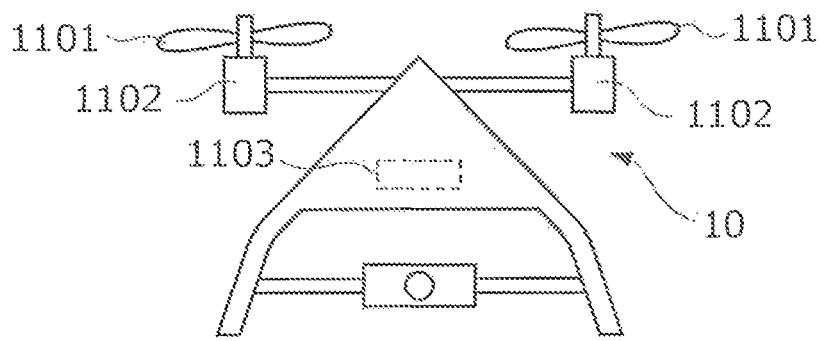
FIG. 2 is a diagram showing an example of an outward appearance of flying vehicle 10, in accordance with the present invention.

FIG. 2 is a diagram showing an example of an outward appearance of flying vehicle 10. Flying vehicle 10 is an unmanned aerial vehicle capable of flying autonomously even when not manually operated. For example, flying vehicle 10 may be a drone. Flying vehicle 10 is provided with propellers 101, drive apparatus 102, and battery 103. Propellers 101 rotate about an axis. Flying vehicle 10 flies due to propellers 101 rotating. Drive apparatus 102 provides power to rotate propellers 101. Drive apparatus 102 is a motor, for example. Drive apparatus 102 may be directly connected to propellers 101, or may be connected to propellers 101 via a transmission mechanism that transmits the power of drive apparatus 102 to propellers 101. Battery 103 supplies electric power to various components of flying vehicle 10 including drive apparatus 102.

Figure 3:
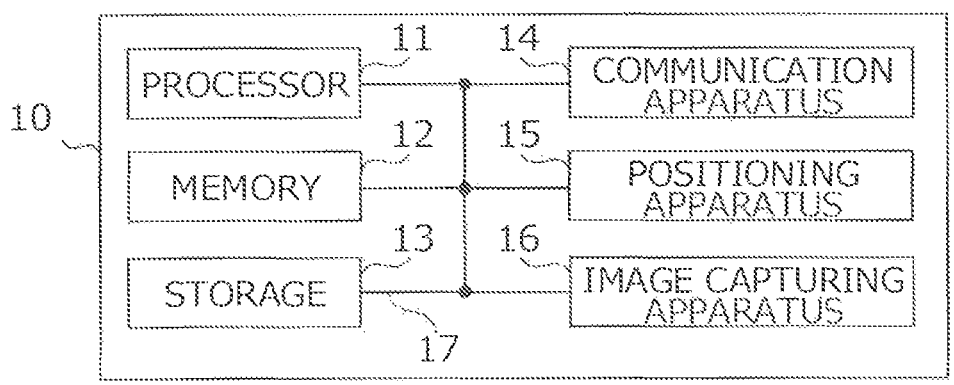
FIG. 3 is a diagram showing an example of a hardware configuration of flying vehicle 10, in accordance with the present invention.

FIG. 3 is a diagram showing an example of a hardware configuration of flying vehicle 10. Flying vehicle 10, physically, may be constituted as a computer apparatus including processor 11, memory 12, storage 13, communication apparatus 14, positioning apparatus 15, image capturing apparatus 16, and bus 17. Note that, in the following description, the word "apparatus" can be replaced by circuit, device, unit, and the like.

Processor 11 operates an operating system to perform overall control of a computer, for example. Processor 11 may be constituted by a central processing unit (CPU) including an interface with a peripheral apparatus, a control apparatus, a computational apparatus, and a register. Also, processor 11 reads out a program (program code), a software module and data from storage 13 and/or communication apparatus 14 to memory 12, and executes various types of processing in accordance therewith. A program that causes a computer to execute at least some of the operations of flying vehicle 10 is used as the program. The various types of processing that are executed in flying vehicle 10 may be executed by one processor 11 or may be executed simultaneously or sequentially by two or more processors 11. Processor 11 may be implemented with one or more chips. Note that the program may be transmitted from a network via a telecommunication line.

Memory 12 is a computer-readable recording medium, and may be constituted by, for example, at least one of a ROM (Read Only Memory), an EPROM (Erasable Programmable ROM), an EEPROM (Electrically Erasable Programmable ROM), and a RAM (Random Access Memory). Memory 12 may be referred to as a register, a cache, a main memory (main storage apparatus), and the like. Memory 12 is able to save an executable program (program code), a software module and the like in order to implement a sending method according to one embodiment of the present invention.

Storage 13 is a computer-readable recording medium, and may be constituted by, for example, at least one of an optical disk such as CD-ROM (Compact Disc ROM), a hard disk drive, a flexible disk, a magneto-optical disk (e.g., compact disk, digital versatile disk, Blu-ray (registered trademark) disk), a smart card, a flash memory (e.g., card, stick, key drive), a floppy (registered trademark) disk, and a magnetic strip. Storage 13 may be referred to as an auxiliary storage apparatus. A flight plan of flying vehicle 10 and map information are stored in advance in storage 13. The flight plan is information indicating a plan of the flight of flying vehicle 10 created in advance. The flight plan includes, for example, a departure point, a transit point, a destination point, a flight path, a scheduled departure time, a scheduled arrival time and a flight speed of flying vehicle 10. Note that, in the case where the airspace that flying vehicle 10 flies through is divided into a plurality of airspace cells, the departure point, the transit point, the destination point and the flight path may be represented by one or more airspace cells. The map information is information indicating a map corresponding to the flight path that is included in the flight plan. For example, the map information may be information indicating a map of a region including points on the ground above which the flight path passes.

Communication apparatus 14 is hardware (transceiver device) for performing communication with a computer via a cable and/or a wireless network, and may, for example, also be referred to as a network device, a network controller, a network card, a communication module, and the like. Communication apparatus 14 is compatible with LPWA (Low Power Wide Area), for example, and performs communication in accordance with LPWA.

Positioning apparatus 15 measures the position of flying vehicle 10 at a predetermined time interval. Positioning apparatus 15 is a GPS (Global Positioning System) receiver, for example, and measures the current position of flying vehicle 10 based on GPS signals received from a plurality of satellites. This position may be represented using latitude, longitude, and altitude, for example.

Image capturing apparatus 16 shoots images of a region on the ground corresponding to the position of flying vehicle 10. Image capturing apparatus 16 is a camera, for example, and shoots images by joining images of the subject on an image sensor, using an optical system. For example, image capturing apparatus 16 may be installed in a position opposing the ground during flight in flying vehicle 10, and shoot images of a region on the ground that is vertically below.

Also, apparatuses such as processor 11 and memory 12 are connected by bus 17 which is for communicating information. Bus 17 may be constituted by a single bus or may be constituted by buses that differ between apparatuses.

FIG. 4 is a diagram showing an example of a functional configuration of flying vehicle 10. Flying vehicle 10 functions as specification unit 111, detection unit 112, determination unit 113, and sending unit 114. These functions are realized by processor 11 performing computational operations, and controlling communication by communication apparatus 14 and readout and/or writing of data in memory 12 and storage 13, due to predetermined software (programs) being loaded to hardware such as processor 11 and memory 12.

Specification unit 111 specifies a feature of the region on the ground corresponding to the position measured by positioning apparatus 15. The region on the ground corresponding to this position is a region including the spot where a line extending vertically from the measured position intersects the ground, for example. This feature represents an object, a phenomenon or a state of the ground surface, for example. The feature of a region may be specified based on map information stored in storage 13 or an image shot by image capturing apparatus 16, for example.

Detection unit 112 detects that flying vehicle 10 has fallen to the ground. Detection of flying vehicle 10 having fallen may be performed using an impact sensor, for example. For example, flying vehicle 10 having fallen to the ground may be detected, in the case where the impact sensor detects an impact value greater than or equal to a predetermined value.

Determination unit 113 determines the sending interval of the position information of flying vehicle 10, according to the feature specified by specification unit 111 or the detection result of detection unit 112. This sending interval of position information changes according to the feature specified by specification unit 111 or the detection result of detection unit 112. For example, in the case where a feature other than a predetermined feature is specified, a standard sending interval may be determined. On the other hand, in the case where the predetermined feature is specified, a sending interval shorter than the standard sending interval may be determined. This predetermined feature is a feature where flying vehicle 10 is difficult to find after having fallen to the ground, for example. Places having the predetermined feature may include places where vision is obstructed such as forests and woods, places that are in motion such as rivers and the ocean, and places that are difficult to access, for example. The places where vision is obstructed may be determined according to the size and density of things that exist in the region on the ground, for example. Also, in the case where it is detected that flying vehicle 10 has fallen to the ground, a longer sending interval than the standard sending interval may be determined.

Sending unit 114 sends position information indicating the position measured by positioning apparatus 15 at the sending interval determined by determination unit 113. This sending of position information is performed in accordance with LPWA, for example. For example, position information is sent to server apparatus 20. The electric power of battery 103 is also consumed when position information is sent in this way. The amount of electric power that is consumed per unit time is greater as the sending interval of position information decreases.

2. Operations
2-1. In-Flight Processing

FIG. 5 is a flowchart showing an example of processing for sending position information that flying vehicle 10 performs in flight. Flying vehicle 10 flies in accordance with the flight plan stored in storage 13. While flying vehicle 10 is flying, positioning apparatus 15 measures the position of flying vehicle 10 at the predetermined time interval. The processing shown in FIG. 5 is started at a predetermined timing while flying vehicle 10 is in flight. For example, processing may be started at the predetermined time interval, or processing may be started every time flying vehicle 10 flies a predetermined distance.

Specification unit 111 specifies a feature of the region on the ground corresponding to the position of flying vehicle 10 (step S11). For example, specification unit 111 may specify a feature of the region on the ground using different methods between the case where flying vehicle 10 is flying along a predetermined flight path and the case where flying vehicle 10 is flying off the predetermined flight path.

In this case, specification unit 111 judges whether flying vehicle 10 is flying along the predetermined flight path, based on the position measured by positioning apparatus 15 and the flight plan stored in storage 13. For example, in the case where the position measured by positioning apparatus 15 is included in the flight path that is included in the flight plan, it is judged that flying vehicle 10 is flying along the predetermined flight path. On the other hand, in the case where the position measured by positioning apparatus 15 is not included in the flight path that is included in the flight plan, it is judged that flying vehicle 10 is flying off the predetermined flight path.

In the case where it is judged that flying vehicle 10 is flying along the predetermined flight path, specification unit 111 specifies a feature of a region on the ground based on the map information stored in storage 13. For example, in the case where, on the map shown by the map information, the region on the ground corresponding to the latitude and longitude measured by positioning apparatus 15 is a plain, the feature "plain" is specified. On the other hand, in the case where it is judged that flying vehicle 10 is flying off the predetermined flight path, specification unit 111 specifies a feature of a region on the ground based on an image shot by image capturing apparatus 16. For example, in the case where, as a result of performing image recognition processing on an image shot by image capturing apparatus 16, the region on the ground corresponding to the latitude and longitude measured by positioning apparatus 15 is recognized as being a wood, the feature "wood" is specified.

Determination unit 113 determines the sending interval of position information, according to table 117 stored in advance in storage 13 and the feature of the region on the ground specified in step S11 (step S12).

FIG. 6 is a diagram showing an example of table 117. Features of regions on the ground and sending intervals of position information are stored in association with each other in table 117. For example, in the case where the feature of the region on the ground is "plain", sending interval T1 stored in association with this feature is determined. Sending interval T1 is 500 msec, for example. On the other hand, in the case where the feature of the region on the ground is "wood", sending interval T2 stored in association with this feature is determined. Sending interval T2 is 1 msec, for example.

Sending unit 114 transmits the position information indicating the position measured by positioning apparatus 15 to server apparatus 20 at the sending interval determined in step S12 (step S13).

Figure 7:
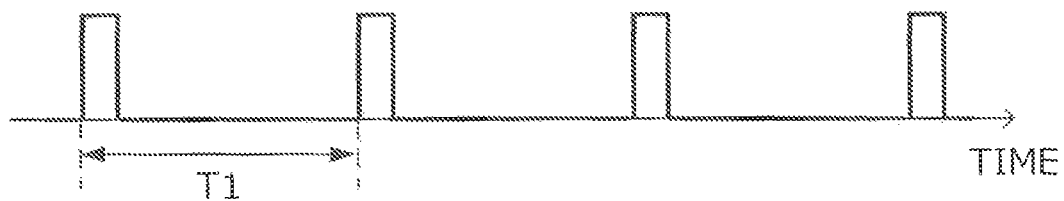
FIG. 7 is a diagram showing an example of sending interval T1, in accordance with the present invention.
Figure 8:
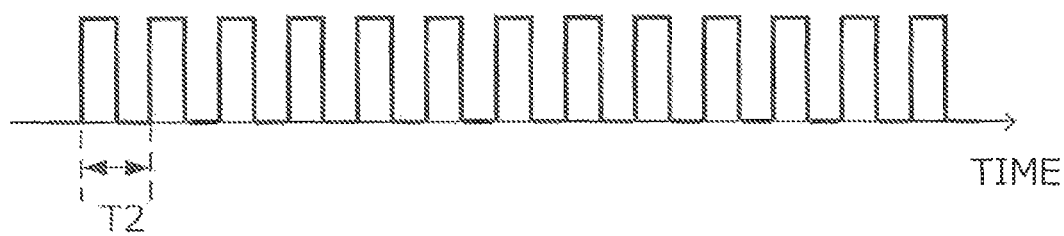
FIG. 8 is a diagram showing an example of sending interval T2, in accordance with the present invention.

FIG. 7 is a diagram showing an example of sending interval T1. FIG. 8 is a diagram showing an example of sending interval T2. Note that, in order to avoid the diagrams becoming complicated, sending interval T1 shown in FIG. 7 and sending interval T2 shown in FIG. 8 are not necessarily displayed to scale. In the case where sending interval T1 is determined, position information is transmitted at sending interval T1, as shown in FIG. 7. For example, in the case where sending interval T1 is 500 msec, position information is transmitted every 500 msec. On the other hand, in the case where sending interval T2 is determined, position information is transmitted at sending interval T2 which is shorter than sending interval T1, as shown in FIG. 8. For example, in the case where sending interval T2 is 1 msec, position information is transmitted every 1 msec.

By repeatedly executing the above-described processing, position information is transmitted at sending interval T1, while flying vehicle 10 is flying over regions on the ground that do not have the predetermined feature, and position information is transmitted at sending interval T2, while flying vehicle 10 is flying over regions on the ground that have the predetermined feature. The position of flying vehicle 10 is recognized, based on the position information thus transmitted from flying vehicle 10. In the case where flying vehicle 10 has fallen to the ground, for example, the operator then searches for and recovers flying vehicle 10, based on the position information last transmitted from flying vehicle 10.

2-2. Post-Fall Processing

Figure 9:
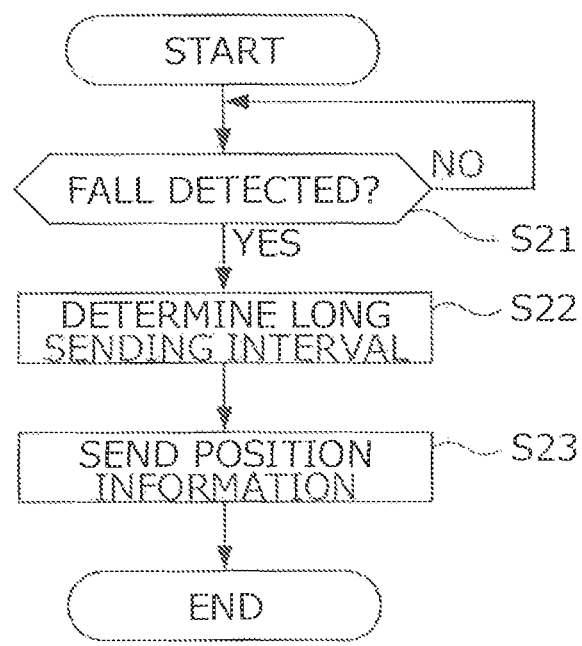
FIG. 9 is a flowchart showing an example of processing for sending position information that flying vehicle 10 performs after falling to the ground, in accordance with the present invention.

FIG. 9 is a flowchart showing an example of processing for sending position information that flying vehicle 10 perform after falling to the ground. Flying vehicle 10 may perform processing for sending position information not only in flight but also after falling to the ground.

While flying vehicle 10 is flying through the air, it is not detected that flying vehicle 10 has fallen to the ground (judgment of step S21 is NO), and thus the judgment of step S21 is repeated. On the other hand, when flying vehicle 10 has fallen to the ground, detection unit 112 detects that flying vehicle 10 has fallen to the ground (judgment of step S21 is YES). In this case, determination unit 113 determines sending interval T3 which longer than above-described sending interval T1 (step S22). Sending interval T3 is 1 sec, for example. Sending unit 114 transmits position information indicating the position measured by positioning apparatus 15 to server apparatus 20 at sending interval T3 determined in step S22 (step S23).

Figure 10:
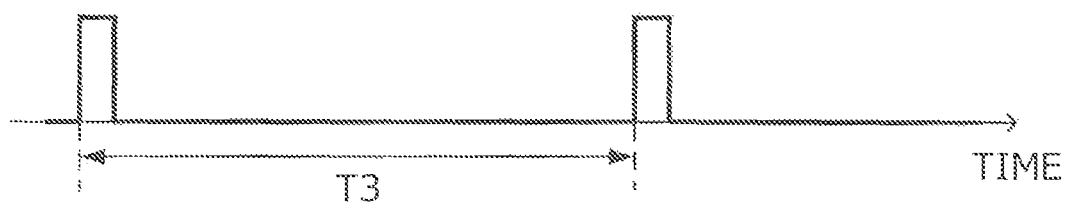
FIG. 10 is a diagram showing an example of sending interval T3, in accordance with the present invention.

FIG. 10 is a diagram showing an example of sending interval T3. Note that, in order to avoid the diagrams becoming complicated, sending interval T1 shown in FIG. 7, sending interval T2 shown in FIG. 8 and sending interval T3 shown in FIG. 10 are not necessarily displayed to scale. In the case where sending interval T3 is determined, position information is transmitted at sending interval T3. For example, in the case where sending interval T3 is 1 sec, position information is transmitted every 1 sec. In the case where position information is transmitted at sending interval T3, the amount of electric power of battery 103 that is consumed per unit time decreases, compared with the case where position information is transmitted at sending interval T1 or T2. In the case where flying vehicle 10 has thus fallen to the ground, the operator searches for and recovers flying vehicle 10, based on the position information last transmitted from flying vehicle 10.

Note that, in the above-described embodiment, "flying vehicle 10", "positioning apparatus 15", "storage 13", "image capturing apparatus 16", "standard sending interval" or "sending interval T1", "sending interval T2" and "sending interval T3" are respectively used as the "sending apparatus", "positioning unit", "storage unit", "image capturing unit", "first sending interval", "second sending interval" and "third sending interval" according to the present invention.

According to the above-described embodiment, in the case where flying vehicle 10 is flying over a region that has the predetermined feature, the sending frequency of position information will be high. In this case, the position of flying vehicle 10 can also be accurately grasped in the case where flying vehicle 10 has fallen to the ground, thus facilitating the recovery of flying vehicle 10 that has fallen to the ground. Also, in the case where flying vehicle 10 has fallen, the sending frequency of position information will be low, thus enabling consumption of the electric power required in sending position information to be suppressed, and the period for which position information is transmitted to be extended. Furthermore, in the case where flying vehicle 10 is flying along the predetermined flight path, features on the ground are specified using map information, thus enabling the features of regions on the ground to be readily specified. In this case, only map information showing the map corresponding to the flight path need be stored, thus enabling the storage area required in order to store map information to be reduced. On the other hand, in the case where flying vehicle 10 is flying off the predetermined flight path, features on the ground are specified based on images shot by image capturing apparatus 16, thus enabling the features of regions on the ground corresponding to the position of flying vehicle 10 to also be specified, in the case where flying vehicle 10 is flying over a region that is not included on the map shown by the map information.

3. Modifications

The present invention is not limited to the above-described embodiment. The above-described embodiment may be modified as follows. Also, two or more of the following modifications may be implemented in combination.

Figure 11:
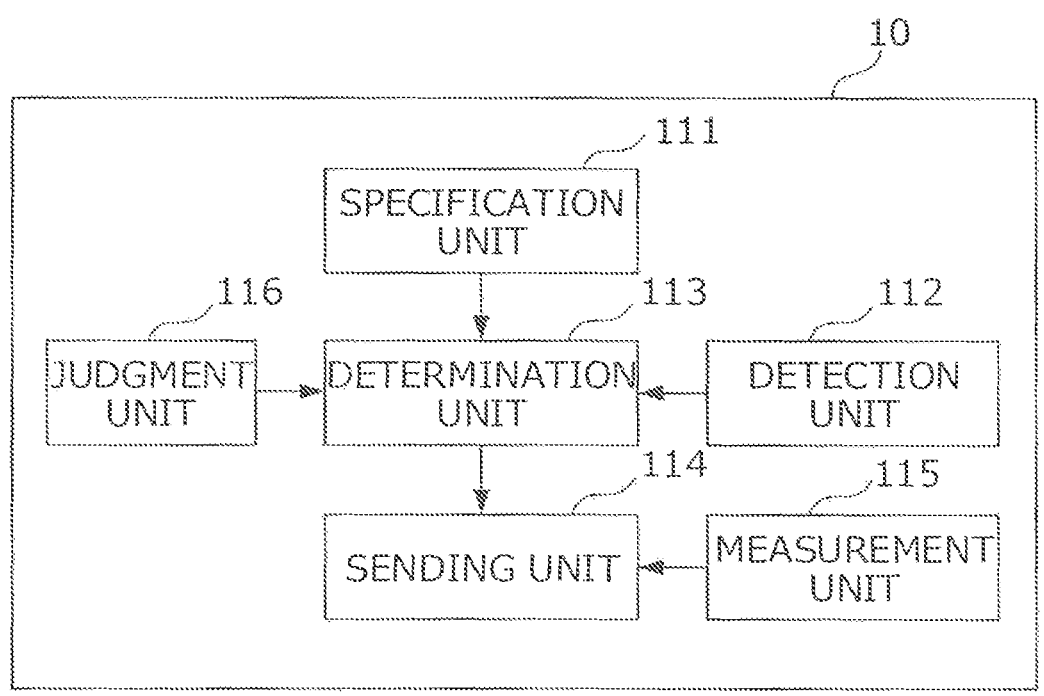
FIG. 11 is a diagram showing an example of a functional configuration of flying vehicle 10 according to a modification, in accordance with the present invention.

In the above-described embodiment, the sending interval of position information may be determined, according to a feature of a region on the ground in the direction of travel of flying vehicle 10, together with the feature of the region on the ground corresponding to the current position of flying vehicle 10 or instead of the feature of this region on the ground. In this case, as shown in FIG. 11, flying vehicle 10 has measurement unit 115, in addition to the functional configuration shown in FIG. 4. Measurement unit 115 measures the direction of travel of flying vehicle 10. Measurement unit 115 may be realized using an acceleration sensor or a magnetic sensor, for example. Specification unit 111 specifies a feature of an upcoming region on the ground corresponding to a position that is a predetermined distance from the current position of flying vehicle 10 in the direction of travel measured by measurement unit 115. This predetermined distance may be a shorter distance than the distance that flying vehicle 10 flies in the current sending interval of position information until position information is next sent, for example. For example, in the case where the current sending interval of position information is 500 msec and flying vehicle 10 is flying at a speed that covers 2.5 m in 500 msec, the predetermined distance may be a distance shorter than 2.5 m. Determination unit 113 determines the sending interval of position information according to the feature of the upcoming region specified by specification unit 111. For example, in the case where the feature of the upcoming region is "wood", sending interval T2 may be determined, even when the region on the ground corresponding to the current position of flying vehicle 10 is "plain". According to this modification, position information can be transmitted at a sending interval that depends on the region on the ground corresponding to a position that flying vehicle 10 will subsequently fly over.

In the above-described embodiment, the direction of travel and the flight speed of flying vehicle 10 may be transmitted together with the position information of flying vehicle 10. In this case, measurement unit 115 shown in FIG. 11 measures the direction of travel and flight speed of flying vehicle 10. Measurement unit 115 may be realized using an acceleration sensor or magnetic sensor and a speedometer, for example. Sending unit 114 sends the direction of travel and flight speed measured by measurement unit 115 together with position information indicating the position measured by positioning apparatus 15, at the sending interval determined by determination unit 113. According to this modification, the operator is able to predict the spot where flying vehicle 10 fell, based on the position information, direction of travel, and flight speed last transmitted by flying vehicle 10.

In the above-described embodiment, increasing the sending frequency of position information may be limited to the case where there is a possibility of flying vehicle 10 falling. In this case, as shown in FIG. 11, flying vehicle 10 has judgment unit 116, in addition to the functional configuration shown in FIG. 4. Judgment unit 116 judges whether there is a possibility of flying vehicle 10 falling, based on state information indicating the state of flying vehicle 10 or weather information indicating the weather corresponding to the position of flying vehicle 10. This weather information is, for example, information indicating the weather of an area that includes the current position of flying vehicle 10, and may be acquired from an external server apparatus that provides weather information. For example, in the case where an anomaly occurs in the body of flying vehicle 10, it may be judged that there is a possibility of flying vehicle 10 falling. Also, in the case where the weather information indicates bad weather, it may be judged that there is a possibility of flying vehicle 10 falling. Determination unit 113, in the case where it is judged that there is not a possibility of falling, determines the standard sending interval, even when the feature specified by specification unit 111 is the predetermined feature. For example, even when the region on the ground corresponding to the position of flying vehicle 10 is "wood", sending interval T1 is determined, in the case where there is no possibility of falling. On the other hand, determination unit 113, in the case where the feature specified by specification unit 111 is the predetermined feature, and it is judged that there is a possibility of falling, may determine a shorter sending interval than the standard sending interval. For example, in the case where the region on the ground corresponding to the position of flying vehicle 10 is "wood", and it is judged that there is a possibility of falling, sending interval T2 may be determined. According to this modification, shortening of the sending interval of position information can be limited to the case where there is a possibility of flying vehicle 10 falling. In this case, since the sending interval of position information is not shortened in the case where there is no possibility of flying vehicle 10 falling, consumption of electric power required in sending position information is suppressed.

In the above-described embodiment, a configuration may be adopted in which the features of regions on the ground are always specified based on map information, irrespective of whether flying vehicle 10 is flying along the predetermined flight path. In this case, map information showing a map of all regions that flying vehicle 10 could possibly fly over is stored in advance in storage 13. Alternatively, a configuration may be adopted in which the features of regions on the ground are always specified based on images shot by image capturing apparatus 16. In this case, map information need not be stored in storage 13. Also, the method of specifying the features of regions on the ground based on map information and the method of specifying the features of regions on the ground based on image shots by image capturing apparatus 16 may both be used. For example, even when the feature of the region on the ground specified based on map information is "plain", the feature of the region on the ground specified based on an image shot by image capturing apparatus 16 may be "wood", due to the situation changing from when the map information was created. In this case, "wood" may be specified as the feature of the region on the ground. Also, even when the feature specified based on map information is "plain", the predetermined feature may be specified, in the case where a moving object that makes it difficult to locate flying vehicle 10 that has fallen to the ground is recognized, as a result of performing image recognition processing on an image shot by image capturing apparatus 16. This moving object may be a group of animals or cars, for example. According to this modification, a sending interval of position information that depends on the feature of the region on the ground during flight can be determined.

In the above-described embodiment, the sending interval of position information may be determined, according to whether there is an object that is moving in the region on the ground. This moving object may be a river, the ocean, a car or an animal, for example. In the case where there is a moving object in the region on the ground, flying vehicle 10 could possibly fall onto this object and move from the spot where it fell, and thus a sending interval shorter than the standard sending interval may be determined. According to this modification, the sending frequency of position information increases, in the case where flying vehicle 10 could possibility have moved from the spot where it fell. Thus, even in the case where flying vehicle 10 moves from the spot where it fell, flying vehicle 10 that has fallen to the ground can be easily recovered.

In the above-described embodiment, position information may be sent, when detection unit 112 detects that flying vehicle 10 has fallen to the ground. According to this modification, the spot where flying vehicle 10 fell can be recognized.

In the above-described embodiment, the sending frequency of position information that depends on the feature of a region on the ground is not limited to being changed between two levels. For example, the sending frequency of position information may change between three or more levels, according to the feature of the region on the ground. In this case, a locating difficulty indicating the degree of difficulty in locating flying vehicle 10 that has fallen to the ground is set, according to the feature of the region on the ground. For example, a shorter sending interval may be determined as this locating difficulty increases.

In the above-described embodiment, the communication standard with which communication apparatus 14 is compatible is not limited to LPWA. Communication apparatus 14 may be compatible with a communication standard other than LPWA.

In the above-described embodiment, sending of position information is not limited to transmission to server apparatus 20. For example, position information may be sent within a predetermined range from the position of flying vehicle 10.

In the above-described embodiment, the method of measuring the position of flying vehicle 10 is not limited to a method that uses GPS. The position of flying vehicle 10 may be measured by a method that does not use GPS.

In the above-described embodiment, at least some of the functions of flying vehicle 10 may be implemented in another apparatus. For example, at least one of specification unit 111, detection unit 112, determination unit 113, measurement unit 115 and judgment unit 116 may be implemented in server apparatus 20. Also, server apparatus 20 may have a function of measuring the position of flying vehicle 10.

The present invention may be provided as a flight management method or a sending method that is provided with processing steps that are performed in flight management system 1, flying vehicle 10, or server apparatus 20. Also, the present invention may be provided as a program that is executed in flying vehicle 10 or server apparatus 20.

The block diagram of FIG. 4 or FIG. 11 shows blocks in functional units. These functional blocks (constituent units) can be realized by any combination of hardware and/or software. Also, means for realizing each functional block is not particularly limited. That is, the functional blocks may be respectively realized by single apparatuses that are physically and/or logically coupled, or two or more apparatuses that are physically and/or logically separated may be directly or indirectly (e.g., wire and/or wirelessly) connected, and the functional blocks may be realized by these plurality of apparatuses.

The hardware configuration of flying vehicle 10 may be constituted so as to include one or more of the apparatuses shown in FIG. 3, or may be constituted to not include some of the apparatuses. Also, flying vehicle 10 may be constituted to include hardware such as a microprocessor, a DSP (Digital Signal Processor), an ASIC (Application Specific Integrated Circuit), a PLD (Programmable Logic Device) and a FPGA (Field Programmable Gate Array), or some or all of the functional blocks of flying vehicle 10 may be realized by such hardware. For example, processor 11 may be implemented by at least one of such hardware.

Modes/embodiments described in the present description may be applied to a system that utilizes LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other appropriate systems, and/or to a next generation system extended based on these systems.

The order of processing procedures, sequences, flowcharts and the like of modes/embodiments described in the present description may be rearranged, as long as there are no inconsistencies. For example, with regard to methods described in the present description, the various elements of steps are presented in an illustrative order, and are not limited to the presented specific order.

Information and the like can be output from a higher-order layer (or lower-order layer) to a lower-order layer (or higher-order layer). Information and the like may be input and output via a plurality of network nodes.

Input and output information and the like may be saved to a specific location (e.g., memory), or may be managed with a management table. Information and the like that is input and output can be overwritten, updated or added. Output information and the like may be deleted. Input information and the like may be transmitted to another apparatus.

Judgments may be performed depending on a value (0 or 1) represented with 1 bit, may be performed depending a Boolean value (true or false), or may be performed depending a numerical comparison (e.g., comparison with a predetermined value).

Modes/embodiments described in the present description may be used independently, may be used in combination, or may be switched for use in association with execution. Also, notification of predetermined information (e.g., notification of "being X") is not limited to being performed explicitly, and may be performed implicitly (e.g., predetermined information is not notified).

Software, whether referred to as software, firmware, middleware, microcode, a hardware description language or by another name, is intended to be broadly interpreted to mean an instruction, an instruction set, a code, a code segment, a program code, a program, a sub-program, a software module, an application, a software application, a software package, a routine, a subroutine, an object, an executable file, an execution thread, a procedure, a function, and the like.

Also, software, instructions and the like may be transmitted and received via a transmission medium. For example, in the case where software is transmitted from a website, a server or another remote source using a wired technology such as a coaxial cable, a fiber optic cable, a twisted pair cable and a digital subscriber line (DSL) and/or a wireless technology such as infrared rays, wireless and microwaves, such wired technologies and/or wireless technologies are included within the definition of a transmission medium.

The terms "system" and "network" that are used in the present description can be used interchangeably.

Also, information, parameters and the like described in the present description may be represented with an absolute value, may be represented with a relative value from a predetermined value, or may be represented with other corresponding information. For example, a wireless resource may be instructed with an index.

The term "determining" that is used in the present description may encompass a diversity of actions. "Determining" can, for example, include judging, calculating, computing, processing, deriving, investigating, looking up (e.g., looking up a table, a database or another data structure), and ascertaining being regarded as "determining". Also, "determining" can include receiving (e.g., receiving information), transmitting (e.g., transmitting information), input, output, and accessing (e.g., accessing data in memory) being regarded as "determining". Also, "determining" can include resolving, selecting, choosing, establishing, comparing and the like being regarded as "determining". That is, "determining" can include an action of some sort being regarded as "determining".

The phrase "based on" that is used in the present description does not mean "only based on", unless specifically stated otherwise. In other words, the phrase "based on" means both "only based on" and "at least based on".

Any reference to elements using the designations "first", "second" and the like that are used in the present description do not generally limit the amount or order of those elements. These designations can be used in the present description as a convenient method of distinguishing between two or more elements. Accordingly, reference to first and second elements does not mean that only two elements can be employed therein or that the first element must precede the second element in some form or other.

The terms "including", "comprising" and variations thereof, insofar as they are used in the description and claims, are intended to be inclusive, similarly to the term "provided with". Furthermore, the term "or" that is used in the description and claims is not intended to be an exclusive OR.

Throughout the disclosure, in the case where articles are added due to translation, such as "a", "an" and "the" in English, for example, these articles are intended to include the plural form, unless the contrary is clearly indicated from the context.

Although the present invention has been described above in detail, it will be evident to a person skilled in the art that the invention is not limited to the embodiments described in the present description. The present invention can be carried out with corrections and modifications without departing from the spirit and scope of the invention defined in the claims. Accordingly, description given herein is illustrative, and is not intended to be interpreted restrictively with respect to the invention.

REFERENCE SIGNS LIST

1 Flight management system
10 Flying vehicle
11 Processor
12 Memory
13 Storage
14 Communication apparatus
15 Positioning apparatus
16 Image capturing apparatus
111 Specification unit
112 Detection unit
113 Determination unit
114 Sending unit
115 Measurement unit
116 Judgment unit

What is claimed is:

1. A sending apparatus comprising:
a positioning device that measures a position of a flying vehicle during flight; and
a processor configured to:
    specify a feature of a region on a ground corresponding to the measured position;
    determine a sending interval of position information indicating the position, according to the specified feature; and
    send the position information at the determined sending interval during the flight.

2. The sending apparatus according to claim 1, wherein the processor is further configured to:
    determine a first sending interval, in a case where the specified feature is a feature other than a predetermined feature, and
    determine a second sending interval that is shorter than the first sending interval, in a case where the specified feature is the predetermined feature.

3. The sending apparatus according to claim 2, wherein the processor is further configured to:
   detect that the flying vehicle has fallen to the ground; and
   determine a third sending interval that is longer than the first sending interval, in a case where the flying vehicle having fallen is detected.

4. The sending apparatus according to claim 1, further comprising:
   a storage device that stores map information showing a map of the region; and
   wherein the processor is further configured to specify the feature based on the map information stored in the storage device.

5. The sending apparatus according to claim 1, further comprising:
   an image capturing device that shoots an image of the region; and
   wherein the processor is further configured to specify the feature based on the shot image.

6. The sending apparatus according to claim 1, further comprising:
   a storage device that stores map information showing a map corresponding to a predetermined flight path;
   an image capturing device that shoots an image of the region; and
   wherein the processor is further configured to:
      specify the feature based on the map information stored in the storage device, in a case where the flying vehicle is flying in accordance with the predetermined flight path; and
      specify the feature based on the shot image, in a case where the flying vehicle is flying off the predetermined flight path.

7. The sending apparatus according to claim 1, wherein the processor is further configured to:
   measure a direction of travel of the flying vehicle;
   specify a feature of another region on the ground corresponding to another position that is a predetermined distance from a current position of the flying vehicle in the measured direction of travel; and
   determine the sending interval according to the specified other feature.

8. The sending apparatus according to claim 1, wherein the processor is further configured to:
   judge whether there is a possibility of the flying vehicle falling, based on state information indicating a state of the flying vehicle or weather information indicating weather corresponding to the position;
   determine a first sending interval, in a case where it is judged that there is not a possibility of the flying vehicle falling; and
   determine a second sending interval that is shorter than the first sending interval, in a case where the specified feature is a predetermined feature, and it is judged that there is a possibility of the flying vehicle falling.

9. A non-transitory computer-readable medium storing a program that causes a computer to execute:
   measuring a position of a flying vehicle during flight;
   specifying a feature of a region on a ground corresponding to the measured position;
   determining a sending interval of position information indicating the position, according to the specified feature; and
   sending the position information at the determined sending interval during the flight.

* * * * *